Dec. 25, 1934.  C. F. KING, JR  1,985,639
ELECTRIC MOTOR CONTROL FOR REFRIGERATED CARS
Filed June 22, 1932
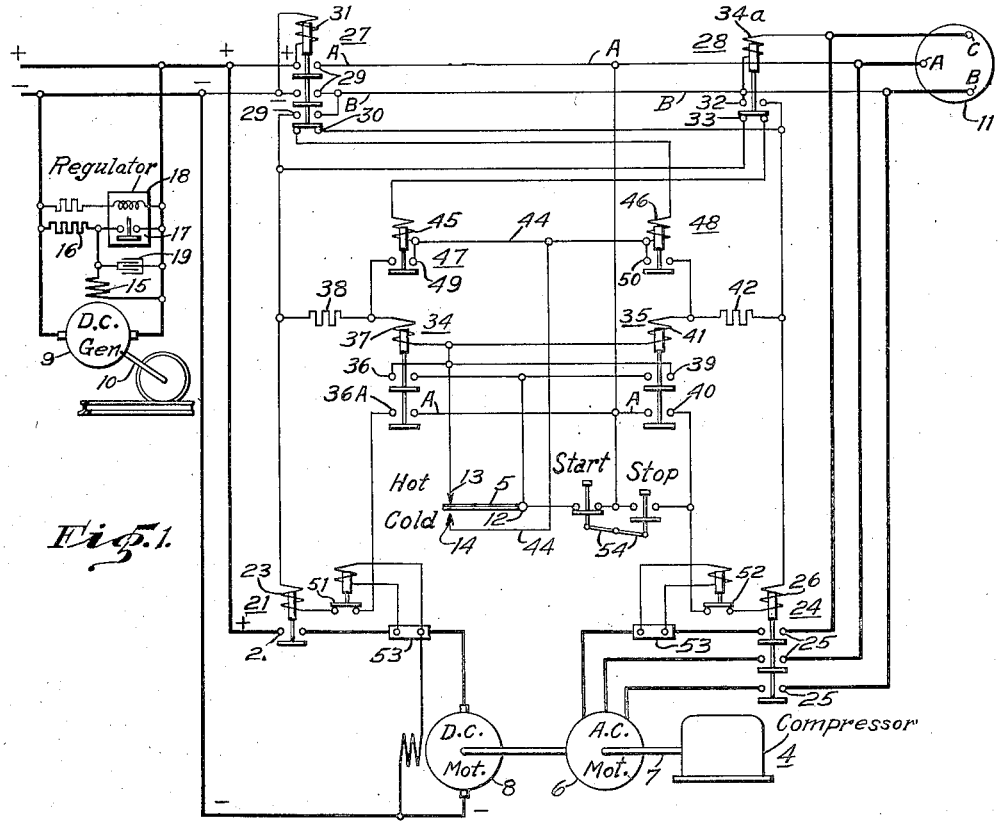
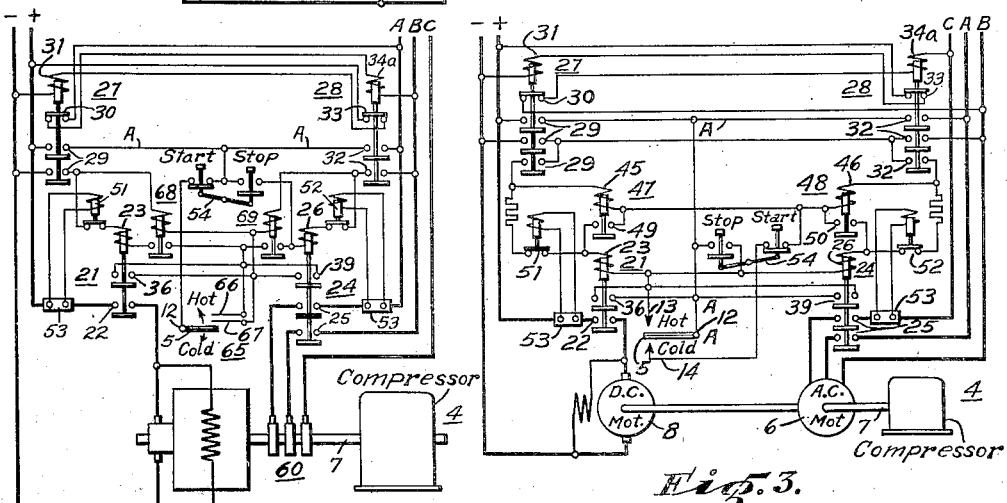
WITNESSES:
INVENTOR
Charles F. King Jr.
BY O. B. Buchanan
ATTORNEY Patented Dec. 25, 1934

1,985,639

UNITED STATES PATENT OFFICE 1,985,639

ELECTRIC MOTOR CONTROL FOR REFRIGERATED CARS

Charles F. King, Jr., Pittsburgh, Pa., assignor to Westinghouse Electric & Manufacturing Company, East Pittsburgh, Pa., a corporation of Pennsylvania Application June 22, 1932, Serial No. 618,638

13 Claims. (Cl. 172—239)

My invention relates to automatic control equipment for installations in which two diverse electric motor-means are utilized to drive a common mechanical load device and are controlled by a common automatic controlling device, the connections being so arranged that the control-means operates only one of the motor-means at a time. My invention relates more particularly to such control-means in connection with electric refrigerator equipment for a railway or other vehicle having a direct-current generator driven from the axle or other source of vehicle power for supplying energy when the vehicle is in motion, and detachable plug connections for supplying energy when the vehicle is stationary.

The object of my invention is to provide a simple control-means for the aforementioned purpose, the same being interlocked electrically so that alternating current cannot enter the direct-current main-circuits or control-circuits, and so that direct current cannot enter the alternating-current main-circuits or control-circuits.

In the accompanying drawing:

Figure 1 is a diagrammatic view of circuits and apparatus embodying my invention in a preferred form; and Figs. 2 and 3 are similar views showing modifications.

In the form of my invention shown in Fig. 1, the refrigerating equipment of a railway car is indicated as comprising a compressor 4, a thermostat 5, an alternating-current motor 6 mounted directly on, or mechanically coupled to, the compressor shaft 7, a direct-current motor 8 mounted on the same shaft as the alternating-current motor 6, an axle-driven direct-current generator 9 mounted directly on, or coupled to, an axle 10 of the car, one or more 3-phase detachable plug connections 11, and control equipment which will be hereinafter described.

The thermostat 5 has a common terminal 12 and "hot" and "cold" contact terminals 13 and 14, respectively. In Fig. 1, it is illustrated as being of the type which "makes" the contact 13 on the "hot" side at a predetermined maximum temperature, and "makes" another contact 14 on the "cold" side at a predetermined minimum temperature; and the subsequently described relays are arranged accordingly. It will be understood, however, that the thermostat-contacts may be broken, instead of being made, on either one or both of the "hot" and "cold" sides of the device, corresponding changes being made in the relays, as will be described, by way of example, in Fig. 2.

It will be understood that the compressor 4 drives a mechanical refrigerator equipment which cools the car, the temperature of the car being indicated by the thermostat 5. The motor-driven refrigerant compressor 4 is mounted under the car. When the car is in motion, power will be available from the axle generator 9, and the direct-current motor 8 will drive the compressor. When the car is not in motion, alternating-current power will be obtained externally by inserting a plug in the receptacle 11, so that the alternating-current motor may drive the compressor. This is particularly necessary in refrigerator cars for freight service, which must be precooled when they are standing at a terminal while perishable commodities are being loaded.

The axle-driven generator 9 is diagrammatically shown as having a self-excited field winding 15 in series with a resistor 16, the field winding being shunted by the vibrating contacts 17 of a voltage regulator 18, the vibrating contacts being also shunted by a capacitor 19 for reducing sparking. This diagrammatic showing is intended to indicate any usual or suitable control-means for an axle-driven generator.

The control equipment comprises a direct-current electromagnetic contactor 21 having one "make" contact 22 for energizing the direct-current motor 8 from the terminals of the direct-current generator 9, and having a direct-current operating coil 23. The control equipment further comprises an alternating-current electromagnetic contactor 24 having three "make" contacts 25 for connecting the alternating-current motor 6 to the three-phase terminals of the detachable plug receptacle 11, and having an alternating-current operating coil 26.

Two main voltage-responsive relays 27 and 28 are provided. The relay 27 has three "make" contacts 29, one "break" contact 30 and a direct-current operating coil 31 which is connected across the direct-current supply circuit which is shown as comprising the terminals of the direct-current generator 9. The relay 28 has one "make" contact 32, one "break" contact 33 and an alternating-current operating coil 34ª which is connected across one phase of the alternating-current line. One of the "make" contacts 29 of the direct-current voltage-relay 27 connects the positive terminal of the generator to the phase-A conductor A of the alternating-current plug connection 11, so that this phase-conductor A will serve as a common terminal of my control device, the same being adapted to be connected to the plus terminal of the supply circuit, if the direct-current relay is energized by the turning of the generator 9, or being adapted to be connected to one phase of a three-phase supply-line if an external connection is made to the detachable plug receptacle 11 when the car is standing at a terminal or wayside station.

The other "make" contacts 29 of the direct-current voltage-relay 27 are utilized to connect one terminal of the direct-current energizing coil 23 of the contactor 21 to the negative terminal of the direct-current source. In like manner, the "make" contact 32 of the alternating-current voltage-relay 28 is utilized to connect one terminal of the alternating-current energizing coil 26 of the contactor 24 to the phase B of the alternating-current supply-circuit.

Instead of controlling the energizing circuits 23 and 26 of the two contactors 21 and 24 directly from the thermostat 5, as will be subsequently described in connection with Figs. 2 and 3, I prefer to utilize, for this purpose, two auxiliary relays 34 and 35. The auxiliary relay 34 has two "make" contacts 36 and 36A and a direct-current operating coil 37, one terminal of which is connected to the "hot" terminal 13 of the thermostat 5, and the other terminal of which is connected through a current-limiting resistor 38 to the negative generator terminal through the "make" contacts 29 of the direct-current voltage-relay 27. The other auxiliary relay 35 is also provided with two "make" contacts 39 and 40, and it has an alternating-current operating coil 41, one terminal of which is connected to the aforesaid "hot" terminal 13 and the other terminal of which is connected to the alternating-current conductor B through a current-limiting resistor 42 and the "make" contact 32 of the alternating-current voltage-relay 28.

The common control-circuit terminal A is connected to one pole of each of the "make" contacts 36A and 40 of the two auxiliary relays 34 and 35, and it is also connected to the common terminal 12 of the thermostat 5. The other poles of the "make" contacts 36A and 40 are utilized to complete the circuits, respectively, to the operating coils 23 and 26 of the direct-current contactor 21 and the alternating-current contactor 24, as the case may be, whenever the thermostat 5 closes its "hot" contact 13, providing, of course, that one of the voltage-relays 27 or 28 is energized at the same time. The other "make" contacts 36 and 39 of the two auxiliary relays 34 and 35, respectively, are utilized to provide a holding circuit, by-passing the "hot" contact 13 of the thermostat, so that, if either auxiliary relay 34 or 35 picks up, in response to the making of a contact at the "hot" terminal 13 of the thermostat, it will remain picked up after the thermostat breaks contact again at said "hot" terminal.

When the thermostat 5 makes contact with its "cold" terminal 14, a circuit 44 is energized from the common terminal A to one terminal of each of two operating coils 45 and 46, respectively, of two additional relays 47 and 48, respectively. The relay 47 has a "make" contact 49 which short-circuits the energizing coil 37 of the direct-current auxiliary relay 34, thereby deenergizing said relay and causing its contacts 36 and 36A to open. The resistor 38 prevents the relay 47 from short-circuiting the direct-current line. When the auxiliary direct-current relay 34 is deenergized, the direct-current contactor 21 is also deenergized, thus stopping the direct-current motor 8. In like manner, the relay 48 is provided with a "make" contact 50 which short-circuits the operating coil 41 of the auxiliary alternating-current relay 35, thus stopping the alternating-current motor 6.

The energizing circuit through the operating coil 45 of the direct-current relay 47 is completed through the "break" contact 33 of the alternating-current voltage-relay 28, so as to ensure that the alternating-current voltage is off before the common terminal A is connected through the relay-coil 45 to the negative direct-current terminal of the generator 9. Similarly, the energizing circuit through the operating coil 46 of the alternating-current relay 48 is completed through the "break" contact 30 of the direct-current voltage relay 27.

I also provide suitable direct-current and alternating-current overload relays 51 and 52 for deenergizing the contactors 21 and 24, respectively, in case of overload on the respective motors 8 and 6. These contactors may be either of the electro-magnetic type, operating from shunts 53 as shown, or they may be any other type commonly used for overload protection.

There may be times when it will be desirable to operate the compressor independently of the thermostat, for test purposes, or otherwise, when the car is stationary. For this purpose, I provide a "start" and "stop" push-button 54, one side of which connects the common terminal A of the control device to the common terminal 12 of the thermostat 5. When the push button is moved to its other position, this connection is broken and a connection is made directly from the common terminal A to the operating coil 26 of the alternating-current contactor 24, so that the alternating-current motor 6 is energized independently of the operation of the thermostat.

In the normal operation of my device, the "start" and "stop" push button 54 is in the position shown in the drawing, wherein it makes a connection between the common terminal A and the terminal 12 of the thermostat. The thermostat provides starting and stopping impulses which are communicated, through the control-circuit relays, to the main contactors 21 and 24, as previously outlined.

Fig. 2 shows several ways in which the control system of Fig. 1 may be modified, within the spirit of my invention. The "break" contact 30 on the direct-current voltage-relay 27 is connected in series with the operating coil 34ª of the alternating-current voltage-relay 28; and the "break" contact 33 of the alternating-current voltage relay is connected in series with the operating coil 31 of the direct-current voltage relay; so that neither voltage relay may be operated except when the other one is deenergized.

It is not necessary for the alternating-current motor 6 and the direct-current motor 8 to be separate from each other. They may be combined in a separate frame or they may be made into a rotary converter or dynamotor 60, as illustrated in Fig. 2.

Ordinarily, it is preferable to utilize auxiliary relays 34 and 35, as shown in Fig. 1, instead of having the thermostat 5 control the larger currents necessary to operate the main-circuit contactors 21 and 24. However, it is feasible for the thermostat to operate directly on the circuits for energizing the operating coils 23 and 26 of the main contactors 21 and 24, as shown in Fig. 2. In this case, the holding-circuit contacts 36 and 39 are added to the contactors 21 and 24, respectively.

A further modification illustrated in Fig. 2 comprises the utilization of a thermostat 65 of a type in which both the "hot" contact 66 and the "cold" contact 67 are on the same side of the bimetallic strip, so that a contact is made at 66 at the maximum temperature of the car and a contact is broken at 67 at the minimum temperature of the car. The broken contact at 67 is utilized to deenergize either one of two auxiliary relays 68 and 69, the relay 68 being energized when the direct-current line is excited and the relay 69 being energized when the alternating-current line is excited. When these auxiliary relays 68 and 69 are deenergized, they open contacts in series with the operating coils 23 and 26 of the main contactors 21 and 24, respectively.

In the modification shown in Fig. 3, the auxiliary relays 34 and 35 of Fig. 1 are omitted, as described in connection with Fig. 2, but the connections are otherwise somewhat similar to those already described for Fig. 1, and hence no detailed description is necessary, the same reference characters being utilized as those previously referred to.

It will be obvious that many alterations and changes may be made in my device without departing from the essential spirit thereof, and I desire that the appended claims be accorded the broadest construction consistent with their language and with the prior art.

I claim as my invention:

1. An electric system for a vehicle, comprising a vehicle-driven direct-current generator and a detachable plug connection for alternating-current energy on the vehicle, an automatic switch means for changing an electrical connection when a predetermined extreme condition is reached and for changing another electrical connection when a second predetermined extreme condition is reached, self-starting dynamo-electric machine means having direct-current terminals and alternating-current terminals, a direct-current electromagnetic contactor for connecting said direct-current terminals to said direct-current generator, said direct-current contactor having a direct-current energizing coil, an alternating-current electromagnetic contactor for connecting said alternating-current terminals to said alternating-current plug connection, said alternating-current contactor having an alternating-current energizing-coil, a direct-current control-circuit including means for affording an indication whether said direct-current generator is up to a predetermined voltage, an alternating-current control-circuit including means for affording an indication whether said alternating-current detachable plug connection is completed, means jointly responsive to said means in the direct-current control-circuit and to the first-mentioned extreme-condition switch-change of said automatic switch means for energizing said direct-current energizing coils and holding them energized, means jointly responsive to said means in the alternating-current control-circuit and to said first-mentioned extreme-condition switch-change for energizing said alternating-current energizing coils and holding them energized, and means responsive to the second extreme-condition switch-change of said automatic means for effecting the deenergization of both energizing coils.

2. The invention as specified in claim 1, characterized by means responsive to the means in the direct-current control-circuit for preventing the completion of a circuit for the alternating-current energizing coils, and means responsive to the means in the alternating-current control-circuit for preventing the completion of a circuit for the direct-current energizing coils.

3. The combination with two diversely energizable motor devices and a common load device therefor, of diverse supply-circuits for said motor devices, respectively, a common automatic control device for giving a starting impulse and a stopping impulse for starting and stopping either of said motor devices, a contactor associated with each motor energizing-circuit for connecting and disconnecting the same from its own corresponding supply-circuit, a main voltage-responsive relay individual to each supply-circuit for picking up when its supply-circuit is energized, and auxiliary control-circuit means comprising means responsive to the movement of a contact arm of each voltage-responsive relay for partially conditioning the circuits for energizing its proper associated contactor, means responsive to the starting impulse of said control device for completing the energization of said proper associated contactor and for completing a "holding" circuit for keeping it energized after the discontinuance of said starting impulse, and means responsive to the stopping impulse of said control device for interrupting the energization of said proper associated contactor through said voltage-responsive relay and said "holding" circuit.

4. The combination with a motor device having an alternating-current energizing-circuit and a direct-current energizing-circuit, and a common load device for the motor device, of an alternating-current supply circuit for said alternating-current energizing-circuit, a direct-current supply-circuit for said direct-current energizing-circuit, a common automatic control device responsive to a condition affected by said common load device for giving a starting impulse and a stopping impulse for energizing and deenergizing either of said motor energizing-means, an alternating-current electromagnetic contactor having an alternating-current energizing-means and having main contacts in series with the alternating-current motor energizing-circuit between said motor energizing-circuit and its supply-circuit, a direct-current electromagnetic contactor having a direct-current energizing-means and having main contacts in series with the direct-current motor energizing-circuit between said motor energizing-circuit and its supply circuit, a main voltage-responsive relay individual to each supply-circuit for picking up when its supply-circuit is energized, means jointly responsive to the energization of the alternating-current voltage-responsive relay and the starting impulse of the common automatic control device for effecting the energization of said alternating-current electromagnetic contactor and for providing a "holding" circuit therefor, means jointly responsive to the energization of the direct-current voltage-responsive relay and the starting impulse of the common automatic control device for effecting the energization of said direct current electromagnetic contactor and for providing a "holding" circuit therefor, and means responsive to the stopping impulse of the common automatic control device for effecting the deenergization of the energized contactor.

5. The combination with a motor device having an alternating-current energizing-circuit and a direct-current energizing-circuit, and a common load device for the motor device, of an alternating-current supply-circuit for said alternating-current energizing-circuit, a direct-current supply-circuit for said direct-current energizing-circuit, a common automatic control device for giving a starting impulse and a stopping impulse for starting and stopping said motor device, said control device having a common terminal adapted to be connected to one terminal of either supply-circuit, an alternating-current electromagnetic switch device having an alternating-current energizing-means and circuit-make-and-break means, a direct-current electromagnetic switch device having a direct-current energizing-means and circuit-make-and-break means, a main voltage-responsive relay individual to each supply-circuit for picking up when its supply-circuit is energized, means operable by the energization of the alternating-current voltage-responsive relay for connecting another terminal of the alternating-current supply-circuit to one terminal of said alternating-current energizing-means for partially preparing an energizing circuit for the same, means operable by the energization of the direct-current voltage-responsive relay for connecting another terminal of said direct-current supply-circuit to one terminal of said direct-current energizing-means for partially preparing an energizing circuit for the same, means responsive to the starting impulse of said common automatic control device for completing a circuit connection to said common terminal through the partially prepared energizing means, means associated with the circuit-make-and-break means of the alternating-current electromagnetic switch means for effecting the energization of the alternating-current motor energizing-means and for holding it energized until the common automatic control device gives a stopping impulse or until the alternating-current supply-circuit becomes inoperative, means associated with the circuit-make-and-break means of the direct-current electromagnetic switch means for effecting the energization of the direct-current motor-energizing means and for holding it energized until the common automatic control device gives a stopping impulse or until the direct-current supply-circuit becomes inoperative, and two separate switching circuits responsive to the stopping impulse of said common automatic control device for "killing" the respective alternating-current and direct-current energizing means of the respective electromagnetic switch devices.

6. The combination with a motor device having an alternating-current energizing-circuit and a direct-current energizing-circuit, and a common load device for the motor device, of an alternating-current supply-circuit for said alternating-current energizing-circuit, a direct-current supply circuit for said direct-current energizing-circuit, a common automatic control device for giving a starting impulse and a stopping impulse for starting and stopping said motor device, said control device having a common terminal adapted to be connected to one terminal of either supply-circuit, an alternating-current electromagnetic contactor having an alternating-current energizing-means and having main contacts in series with the alternating-current motor energizing-circuit between said motor energizing-circuit and its supply-circuit, a direct-current electromagnetic contactor having a direct-current energizing-means and having main contacts in series with the direct-current motor energizing-circuit between said motor energizing-circuit and its supply circuit, a main alternating-current voltage-responsive relay associated with the alternating-current supply-circuit for supplying alternating-current voltage across one terminal of said alternating-current energizing-means and said common terminal of the control device, a main direct-current voltage-responsive relay associated with the direct-current supply-circuit for supplying direct-current voltage across one terminal of said direct-current energizing-means and said common terminal of the control device, means responsive to the starting impulse of the control device for completing a circuit through both terminals of the appropriate energizing-means from the voltage which is supplied across said energizing-means terminal and said common terminal by its associated main voltage-responsive relay, and means responsive to the stopping impulse of the control device for interrupting said last-mentioned circuit.

7. The combination with a motor device having an alternating-current energizing-circuit and a direct-current energizing-circuit, and a common load device for the motor device, of an alternating-current supply-circuit for said alternating-current energizing-circuit, a direct-current supply-circuit for said direct-current energizing-circuit, a common automatic control device responsive to a condition affected by said common load device for giving a starting impulse and a stopping impulse for energizing and deenergizing either of said motor energizing means, one terminal of said alternating-current energizing means and one terminal of said direct-current energizing means being joined to a common junction-point, means operable by said control device for joining said junction-point to the common terminal of said control device in response to its starting impulse for partially preparing an energizing-circuit for both of said energizing-means, a main voltage-responsive relay individual to each supply-circuit for picking up when its supply-circuit is energized, means responsive to the actuation of the alternating-current voltage-responsive relay for completing an energizing circuit connection to another terminal of the alternating-current supply-circuit through said alternating-current energizing-means, means responsive to the actuation of the direct-current voltage-responsive relay for completing an energizing connection to another terminal of the direct-current supply-circuit through said direct-current energizing means, means associated with the circuit-make-and-break means of the alternating-current electromagnetic switch means for effecting the energization of the alternating-current motor energizing-means and for holding it energized until the common automatic control device gives a stopping impulse or until the alternating-current supply-circuit becomes inoperative, means associated with the circuit-make-and-break means of the direct-current electromagnetic switch means for effecting the energization of the direct-current motor-energizing means and for holding it energized until the common automatic control device gives a stopping impulse or until the direct-current supply-circuit becomes inoperative, and two separate switching circuits responsive to the stopping impulse of said common automatic control device for "killing" the respective alternating-current and direct-current energizing means of the respective electromagnetic switch devices.

8. The combination with two diverse motor devices and a common load device therefor, of diverse supply-circuits for said motor devices, respectively, a common automatic control device for giving a starting impulse and a stopping impulse for starting and stopping either of said motor devices, a contactor associated with each motor energizing-circuit for connecting and disconnecting the same from its own corresponding supply-circuit, a main voltage-responsive relay individual to each supply-circuit for picking up when its supply-circuit is energized, and auxiliary control-circuit means comprising a pair of auxiliary relays, one of said auxiliary relays being associated with each of said main voltage-responsive relays, and both of said auxiliary relays being associated with said common automatic control device, the connections being such that, when either of the main voltage-responsive relays is in its excited position, its associated auxiliary relay will pick up when the control device gives its starting impulse and will lock itself in until the control device gives its stopping impulse, and connections between the relay contacts of each auxiliary relay and the proper one of said contactors so that the contactor is energized as long as, and only as long as, its associated auxiliary relay is in its excited position.

9. The combination with a motor device having an alternating-current energizing-circuit and a direct-current energizing-circuit, and a common load device for the motor device, of an alternating-current supply-circuit for said alternating-current energizing-circuit, a direct-current supply-circuit for said direct-current energizing-circuit, a common automatic control device for giving a starting impulse and a stopping impulse for starting and stopping said motor device, said control device having a common terminal adapted to be connected to one terminal of either supply-circuit, an alternating-current auxiliary relay having an alternating-current operating magnet, a direct-current auxiliary relay having a direct-current operating magnet, a main alternating-current voltage-responsive relay associated with the alternating-current supply-circuit for connecting two alternating-current supply-circuit leads to the first terminal of said alternating-current auxiliary relay and said common terminal of the control device, respectively, a main direct-current voltage-responsive relay associated with the direct-current supply-circuit for connecting two direct-current supply-circuit leads to the first terminal of said direct-current auxiliary relay and said common terminal of the control device, respectively, means responsive to the starting impulse of the control device for completing a circuit between the common terminal of the control device and the second terminals of said relays, an alternating-current electromagnetic contactor having an alternating-current energizing-means and having main contacts in series with the alternating-current motor energizing-circuit between said motor energizing-circuit and its supply circuit, a direct-current electromagnetic contactor having a direct-current energizing-means and having main contacts in series with the direct-current motor energizing-circuit between said motor energizing-circuit and its supply circuit, the alternating-current auxiliary relay having contact-members for energizing said alternating-current energizing-means from said alternating-current supply-circuit, the direct-current auxiliary relay having contact-members for energizing said direct-current energizing-means from said direct-current supply-circuit, means for providing a holding-circuit for the operating magnets of each of said auxiliary relays, and means responsive to the stopping impulse of the control device for interrupting said holding-circuit.

10. The invention as defined in claim 9, said last-mentioned means comprising, an auxiliary alternating-current relay for interrupting the holding-circuit of the relay which energizes the alternating-current contactor, an auxiliary direct-current relay for interrupting the holding-circuit of the relay which energizes the direct-current contactor, and auxiliary contact-members on the main voltage-responsive relays for preventing a "sneak-circuit" through the magnet windings of the relays belonging to the supply-circuit which is not energized.

11. The combination with a motor device having an alternating-current energizing circuit and a direct-current energizing-circuit, and a common load device for the motor device, of an alternating-current supply-circuit for said alternating-current energizing-circuit, a direct-current supply-circuit for said direct-current energizing-circuit, a common automatic control device for giving a starting impulse and a stopping impulse for starting and stopping said motor device, said control device having a common terminal adapted to be connected to one terminal of either supply-circuit, an alternating-current electromagnetic contactor having an alternating-current energizing-means and having main contacts in series with the alternating-current motor energizing-circuit between said motor energizing-circuit and its supply-circuit, a direct-current electromagnetic contactor having a direct-current energizing-means and having main contacts in series with the direct-current motor energizing-circuit between said motor energizing-circuit and its supply circuit, one terminal of said alternating-current energizing means and one terminal of said direct-current energizing means being joined to a common junction-point, means operable by said control device for joining said junction-point to the common terminal of said control device in response to its starting impulse, a main voltage-responsive relay individual to each supply-circuit for picking up when its supply-circuit is energized, means operable by the energization of the alternating-current voltage-responsive relay for connecting the other terminal of the alternating-current energizing-means and the common terminal of said control device across the alternating-current supply-circuit when the latter is energized, means operable by the energization of the direct-current voltage-responsive relay for connecting said other terminal of the direct-current energizing-means and the common terminal of said control device across the direct-current supply-circuit when the latter is energized, means operable in response to the energization of either of the aforesaid energizing-means for closing a "holding" circuit between said common junction-point and the common terminal of said control device, and means responsive to the stopping impulse of said control device for interrupting the energization of the energized energizing-means whereby said "holding" circuit is broken and the energized contactor is deenergized.

12. The invention as defined in claim 11, characterized by said stopping impulse comprising a stopping-impulse contact which is closed by said control device, and a pair of stopping-impulse relays each having one terminal connected to said stopping-impulse contact and another terminal connected, respectively, to said alternating-current supply-circuit or to said direct-current supply-circuit, so that, whichever voltage-responsive relay is energized, the appropriate stopping-impulse relay will be actuated.

13. The invention as defined in claim 11, characterized by said stopping impulse comprising a stopping-impulse contact which is opened by said control device, said starting impulse comprising a starting-impulse contact which is closed by said control device while said stopping-impulse contact is also closed, and "holding" circuit being connected between said starting-impulse contact and said starting-impulse contact.

CHARLES F. KING, Jr.